E. D. SHANNON.
HEATER FOR STEERING DEVICES FOR MOTOR DRIVEN VEHICLES.
APPLICATION FILED JULY 8, 1912.
1,042,156.
Patented Oct. 22, 1912.
2 SHEETS—SHEET 1.
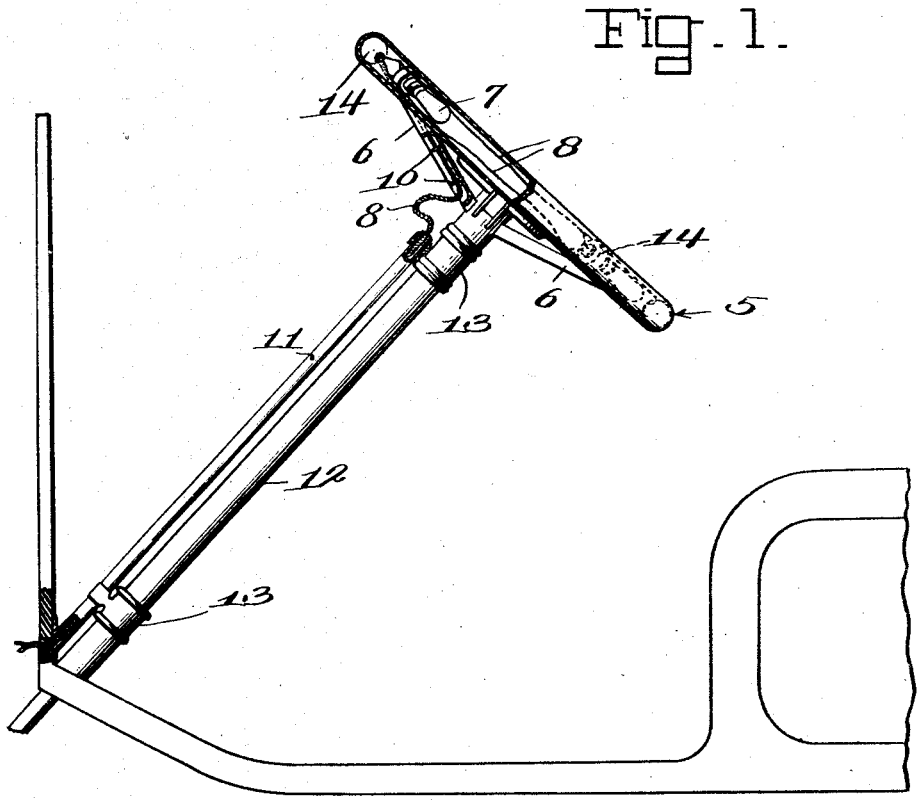
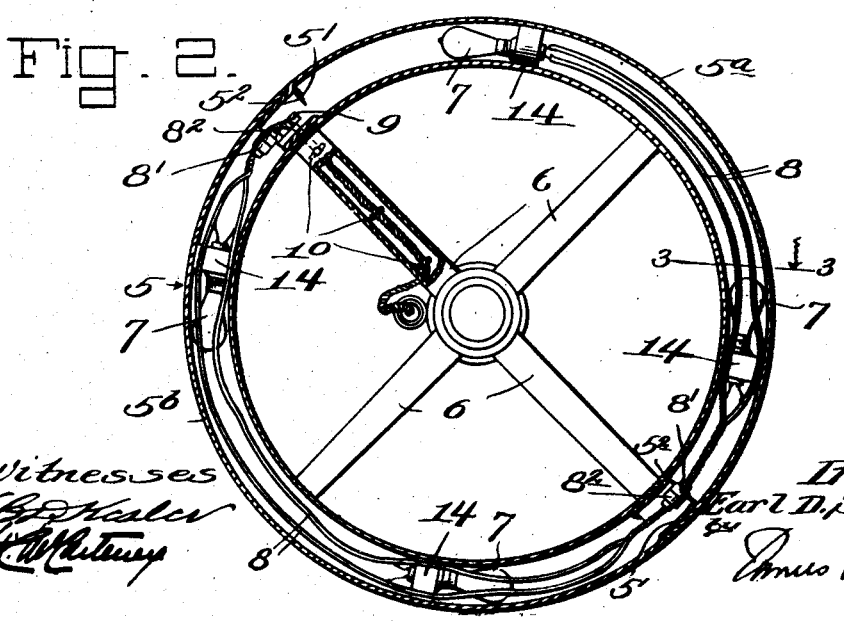

E. D. SHANNON.
HEATER FOR STEERING DEVICES FOR MOTOR DRIVEN VEHICLES.
APPLICATION FILED JULY 8, 1912.
1,042,156.
Patented Oct. 22, 1912.
2 SHEETS—SHEET 2.
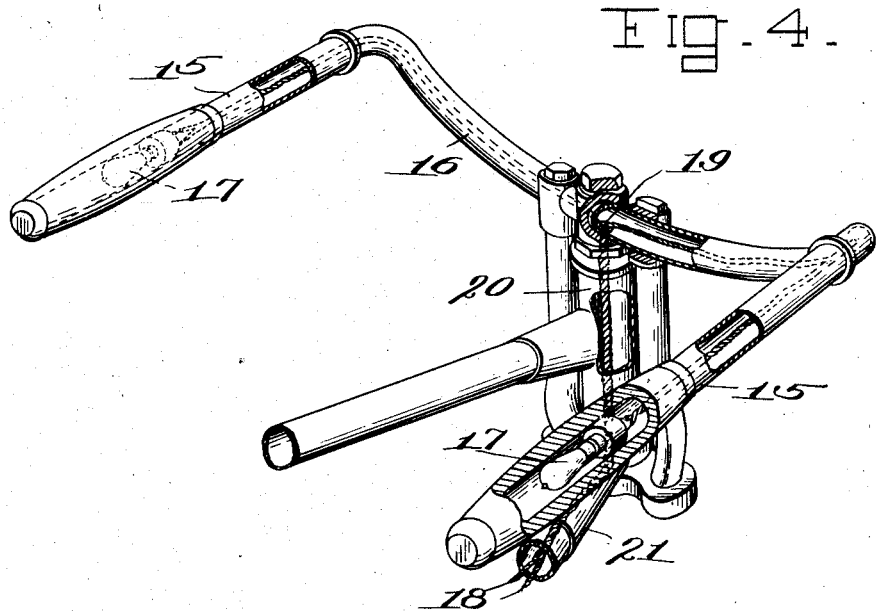
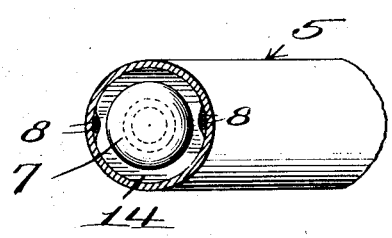

UNITED STATES PATENT OFFICE.

EARL D. SHANNON, OF ALPENA, MICHIGAN.

HEATER FOR STEERING DEVICES FOR MOTOR-DRIVEN VEHICLES.

1,042,156.

Specification of Letters Patent.

Patented Oct. 22, 1912.

Application filed July 8, 1912. Serial No. 708,305.

*To all whom it may concern:*

Be it known that I, EARL D. SHANNON, a citizen of the United States, residing at Alpena, in the county of Alpena and State of Michigan, have invented new and useful Improvements in Heaters for Steering Devices for Motor-Driven Vehicles, of which the following is a specification.

The present invention has reference to steering devices for motor driven vehicles, and more especially to an improved means for heating such devices.

It comprehends, briefly, the provision of an electrically-heated element or series of elements which may be inserted with equal facility in the wheel, or other directly operated part of a motor car, and also in the handle bar of a motor cycle, and which may be readily adjusted so as to heat any desired part of such wheel or bar.

An embodiment of the invention is illustrated in the accompanying drawings, wherein—

Figure 1 is a side elevation, with parts broken away and in section, showing said invention applied to the steering wheel of a motor car; Fig. 2 is an enlarged horizontal sectional view of said wheel; Fig. 3 is an enlarged transverse section taken on the line 3—3 of Fig. 2; and Fig. 4 is a perspective view, also with parts broken away and in section, showing the invention applied to the handle bar of a motor cycle.

In both of the constructions represented, the steering device is heated by means of a plurality of electrically-heated resistance elements, shown as in the form of incandescent lamps. Referring more particularly to Figs. 1 to 3, the hollow wheel rim 5 depicted therein is designed to replace the solid wood rim in ordinary use and to be fastened in any desired manner to the outer ends of the spokes 6, which latter preferably have a slightly channeled formation, as is customary. This rim is composed of two semi-circular sections $5^a$ and $5^b$ whose ends have a telescopic-joint connection, indicated by the numerals $5^1$ and $5^2$, the ends $5^1$ being removably fitted in the ends $5^2$, as shown.

The lamps 7, which are connected to the wires 8, are inserted within the hollow rim sections before the latter are coupled, as will be understood, being introduced through the ends of the sections in any convenient way and disposed at any desired distance apart, so as to heat all portions of the rim equally, or to concentrate the heat at some predetermined point. In the construction illustrated, four lamps are utilized, (although there is no necessary limitation to that precise number), and are spaced equidistantly from one another, the wires being furnished adjacent the points where the rim sections are joined with suitable detachable connections $8^1$ and $8^2$. To provide an exit for the wires from the rim, a passage 9 may be formed in the latter, by preference at one of the two joints between the ends of the rim section, such passage being produced by the formation of registering slots or openings in the section ends, or in any other desired manner. The wires, on being passed through this exit, are twisted together to form a single rope or cable which is led along the channel in the adjacent spoke and is thus concealed, being held in place therein by screw-eyes 10, or the like. On being passed through the innermost screw-eye, the cable is led into an open-ended tube 11 that is arranged parallel with the steering post 12 and is clamped or otherwise attached to the same by sleeves 13 or the like. Through this tube, the wires pass to the batteries, (not shown), which latter may be located at any suitable point on the car. In order to retain the lamps in adjusted position within the rim, and to prevent them from rattling or vibrating, their porcelain socket portions may be fitted with annular buffers 14 of rubber or other suitable material, which frictionally engage the inner wall of the rim.

Where the invention is applied to a motor cycle, as depicted in Fig. 4, each of the bent portions or arms 15 of the handle bar 16 receives a lamp 17 which is identical in construction with those previously described, the wires 18 being led toward each other and passed through a central opening 19 in the bar into the vertical front member or post 20 of the frame, whence they are led through the inclined bottom member 21 to the batteries.

The operation of the device, in both forms of the invention, is believed to be apparent, and to require no additional description, but it is to be noted that the invention presents a distinct advantage over the ordinary exhaust-heated device, inasmuch as the employment of the exhaust from the motor for that purpose necessarily results in the heating chamber and the air pipes leading thereto becoming fouled by the deposits of carbon which rapidly accumulate therein and eventually form an insulating coating that impairs the heating action of the exhaust upon the chamber walls. Moreover, the comparatively long distance which the exhaust has to travel before reaching the heating chamber obviously entails a considerable loss of heat units, so that the efficiency of the exhaust for heating purposes is materially lowered. On the other hand, the use of electrically-heated resistance elements avoids all of the afore-mentioned defects and, furthermore, does not to the least extent impair any other mechanism of the vehicle, it being understood that the term "motor-driven vehicle" is employed in its broadest sense and as covering both a motor car and a motor cycle.

It will also be understood that the application of the invention to any standard make of car may be effected merely by the substitution of the electrically-heated rim for the ordinary solid wood rim, and the attachment of the guide tube to the steering post. In consequence, therefore, there is no derangement of the ordinary parts of the steering mechanism, nor are any costly or complicated parts added which might interfere with the operation of such mechanism in any way.

I claim as my invention:

1. A hollow steering device for motor-driven vehicles having a heater disposed within its interior and movable to any position therein, said heater embodying an electric resistance element, means for supplying a current thereto, and means associated with said heater for retaining the same in adjusted position.

2. A hollow steering device for motor-driven vehicles having a heater disposed within its interior and movable to any position therein, said heater embodying an electric resistance element, means for supplying a current thereto, and means carried by said element and frictionally engaged with the interior wall of said device for retaining said element in adjusted position.

3. A hollow steering device for motor-driven vehicles having an electric heater disposed within its interior and provided with current supplying connections, said heater consisting of a plurality of connected resistance elements movable within said device toward and from one another to vary the zone to be heated and the temperature of such zone.

4. A hollow steering device for motor-driven vehicles having an electric heater disposed within its interior and provided with current-supplying connections, said heater consisting of a plurality of connected resistance elements movable within said device toward and from one another to vary the zone to be heated and the temperature of such zone, and means carried by said elements for retaining the same in adjusted position.

5. A hollow steering device for motor-driven vehicles having a heater disposed within its interior, said heater embodying an incandescent lamp movable within said device and provided with means for retaining it in adjusted position.

6. A hollow steering device for motor-driven vehicles having a heater disposed within its interior, said heater embodying an incandescent lamp movable within said device and provided with a rubber buffer frictionally engaged with the interior wall of said device for retaining it in adjusted position.

7. A hollow rim for steering wheels comprising a pair of semi-circular sections having their adjacent ends removably coupled together, and a plurality of connected electrically-heated resistance elements disposed within said sections for heating the same, said elements being movable bodily within said sections, to vary the zone to be heated and the temperature of such zone, and being provided with means for retaining them in adjusted position.

In testimony whereof I have hereunto set my hand in presence of two subscribing witnesses.

EARL D. SHANNON.

Witnesses:
LAURA LYTLE,
IRVIN S. CANFIELD.